(12) United States Patent
Zhu et al.

(10) Patent No.: US 11,437,897 B2
(45) Date of Patent: Sep. 6, 2022

(54) SURFACE TREATMENTS OF ELECTRICAL STEEL CORE DEVICES

(71) Applicant: Ford Global Technologies, LLC, Dearborn, MI (US)

(72) Inventors: Leyi Zhu, Novi, MI (US); Edward Chan-Jiun Jih, Troy, MI (US); Feng Liang, Troy, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/132,965

(22) Filed: Dec. 23, 2020

(65) Prior Publication Data

US 2021/0119517 A1   Apr. 22, 2021

Related U.S. Application Data

(63) Continuation of application No. 15/987,159, filed on May 23, 2018, now Pat. No. 10,879,775.

(51) Int. Cl.
| | |
|---|---|
| *H02K 15/03* | (2006.01) |
| *H02K 1/2706* | (2022.01) |
| *B32B 37/18* | (2006.01) |
| *B32B 38/04* | (2006.01) |
| *B32B 15/01* | (2006.01) |
| *H02K 15/02* | (2006.01) |
| *H02K 1/276* | (2022.01) |

(52) U.S. Cl.
CPC ............ *H02K 15/03* (2013.01); *B32B 15/011* (2013.01); *B32B 37/18* (2013.01); *B32B 38/04* (2013.01); *H02K 1/2706* (2013.01); *B32B 2038/042* (2013.01); *H02K 1/2766* (2013.01); *H02K 15/02* (2013.01)

(58) Field of Classification Search
CPC ....... B32B 15/011; B32B 37/18; B32B 38/04; B32B 2038/042; H02K 1/27; H02K 1/2706; H02K 1/2766; H02K 15/02; H02K 15/03
USPC ..... 29/606, 607, 609; 310/216.004, 216.016, 310/216.017
See application file for complete search history.

(56) References Cited

U.S. PATENT DOCUMENTS

| | | | |
|---|---|---|---|
| 2009/0026025 A1* | 1/2009 | Hampton | F16D 65/127 188/218 XL |
| 2015/0118044 A1* | 4/2015 | Hippen | F01D 15/10 415/229 |
| 2018/0241264 A1* | 8/2018 | Shono | H02K 15/03 |
| 2020/0083788 A1* | 3/2020 | Zhu | H02K 1/2766 |
| 2020/0112210 A1* | 4/2020 | Zhu | H02K 1/276 |

* cited by examiner

*Primary Examiner* — Rashad H Johnson
(74) *Attorney, Agent, or Firm* — David B. Kelley; Brooks Kushman P.C.

(57) ABSTRACT

An electric machine includes a plurality of planar laminations stacked to form an electrical steel rotor having openings defining magnet pockets and adjacent inner side pockets. The adjacent inner side pockets define a center bridge therebetween and have blasted surface portions such that compressive stress layers are induced along edges of the center bridge to strengthen the center bridge.

11 Claims, 5 Drawing Sheets

SURFACE TREATMENTS OF ELECTRICAL STEEL CORE DEVICES

CROSS-REFERENCE TO RELATED APPLICATION

This application is a division of application Ser. No. 15/987,159, filed May 23, 2018, the disclosure of which is hereby incorporated in its entirety by reference herein.

TECHNICAL FIELD

This application generally relates to processes applied to treat surfaces of electric devices, such as an electric machine rotor, via blasting the surface to smooth cut edges and introduce compressive residual stress.

BACKGROUND

Electric machines and devices are utilized in electrified vehicles. The overall performance and reliability of the vehicle can be impacted by characteristics of the electrical device. The electrical devices should be designed to satisfy various requirements including power and torque requirements that may be specific to each vehicle, along with rotational speed and the associated centrifugal force of the rotor such that structural integrity is maintained during operation.

SUMMARY

A method includes punching electrical steel sheets to form laminations each having openings defining magnet pockets and adjacent inner side pockets that define a center bridge therebetween, assembling the laminations into an electrical device core, and blasting the adjacent inner side pockets without blasting the magnet pockets such that compressive stress layers are induced along edges of the center bridge to strengthen the center bridge.

An electric machine includes a plurality of planar laminations stacked to form an electrical steel rotor having openings defining magnet pockets and adjacent inner side pockets. The adjacent inner side pockets define a center bridge therebetween and have blasted surface portions such that compressive stress layers are induced along edges of the center bridge to strengthen the center bridge.

DETAILED DESCRIPTION

Figure 1:
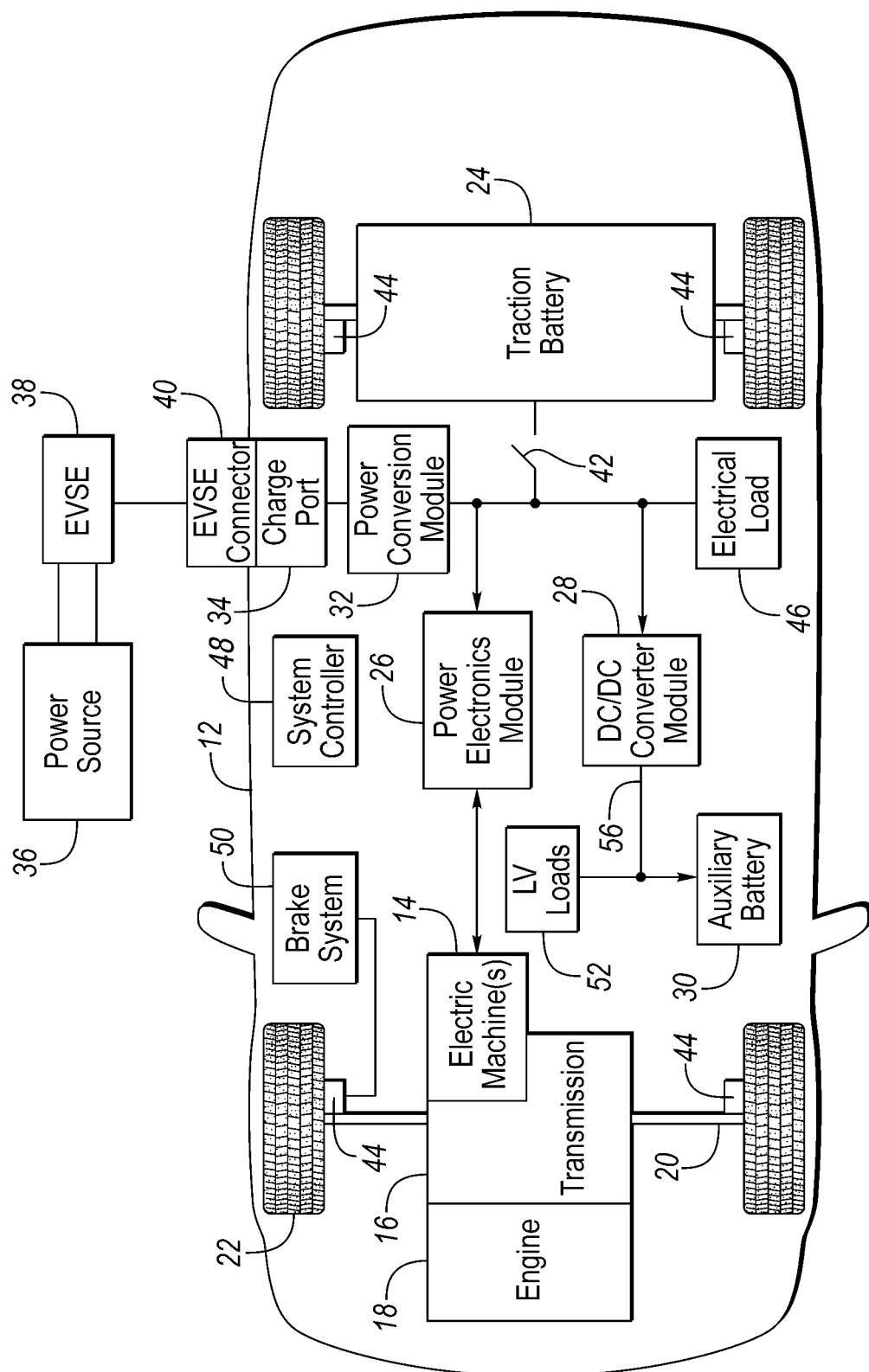
FIG. 1 is a block diagram of a hybrid vehicle illustrating typical drivetrain and energy storage components including an electric machine.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrical steel is commonly used in rotating electric machines, such as motors, generators and the like. During operation, centrifugal force due to rotation may stress rotor laminations. The stress of the laminations may affect the structural integrity of rotor core assembly via fatigue.

Electrical steel is formed into rotor cores usually via cutting laminations to a finished core shape by a punch and die and then stacked together to form the core. The punching process can create microscopic defects at the cutting edges, such as cracks, surface burrs/debris, chips, and notches. Analysis of the fractured surfaces of rotor lamination after fatigue tests shows that a cause of lamination fatigue may be attributed to the punching defects. The punching process also involves strong shearing at the cutting edge and may result in a complicated residual stress profile with both tensile and compressive stresses. It is well known that tensile stress affects fatigue life adversely.

One solution includes the use of electrical steel with a higher mechanical property rating. The higher mechanical property rating has better fatigue performance that can partially solve the problem. However, the use of higher mechanical property rating material comes at a price as the cost is typically greater and the material may have a lower electrical steel flux density property. In addition, the unpredictable occurrence of microscopic defects due to punching can lead to a large variation of electrical steel fatigue life, which is undesirable for quality control of the rotor core.

Here, an alternative is presented in which the microscopic punching defects at the cutting edge of electrical steel are removed by a mechanical smoothing method. In one example, the electrical steel is first punched into the finished shape, (e.g., a rotor lamination of an electric machine). Next, the laminations are stacked together to form a core, (e.g., a rotor core of an electric machine). Lastly, the assembled core is then treated by forcibly propelling a stream of abrasive material (i.e., media) against a pre-defined cutting surface of the rotor core to smooth the rough cutting surface of the microscopic defects. Aspects of the improved fatigue life include smoothing cutting defects to prevent fatigue crack initiation and inducing a compressive stress layer to prevent crack initiation and propagation.

FIG. 1 depicts a plug-in hybrid-electric vehicle (PHEV). A PHEV 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high-voltage direct current (DC) output. One or more contactors 42 may isolate the traction battery 24 from a high-voltage bus when opened and couple the traction battery 24 to the high-voltage bus when closed. The traction battery 24 is electrically coupled to one or more power electronics modules 26 via the high-voltage bus. The power electronics module 26 is also electrically coupled to the electric machines 14 and provides the ability to bi-directionally transfer energy between the high-voltage bus and the electric machines 14. For example, a traction battery 24 may provide a DC voltage while the electric machines 14 may operate with a three-phase alternating current (AC) to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that is electrically coupled to the high-voltage bus. The DC/DC converter module 28 may be electrically coupled to a low-voltage bus 56. The DC/DC converter module 28 may convert the high voltage DC output of the traction battery 24 to a low voltage DC supply that is compatible with low-voltage vehicle loads 52. The low-voltage bus 56 may be electrically coupled to an auxiliary battery 30 (e.g., 12V battery). The low-voltage systems 52 may be electrically coupled to the low-voltage bus 56.

The vehicle 12 may be an electric vehicle or a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands via a brake pedal and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. The high-voltage loads 46 may include compressors and electric heaters.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2B:
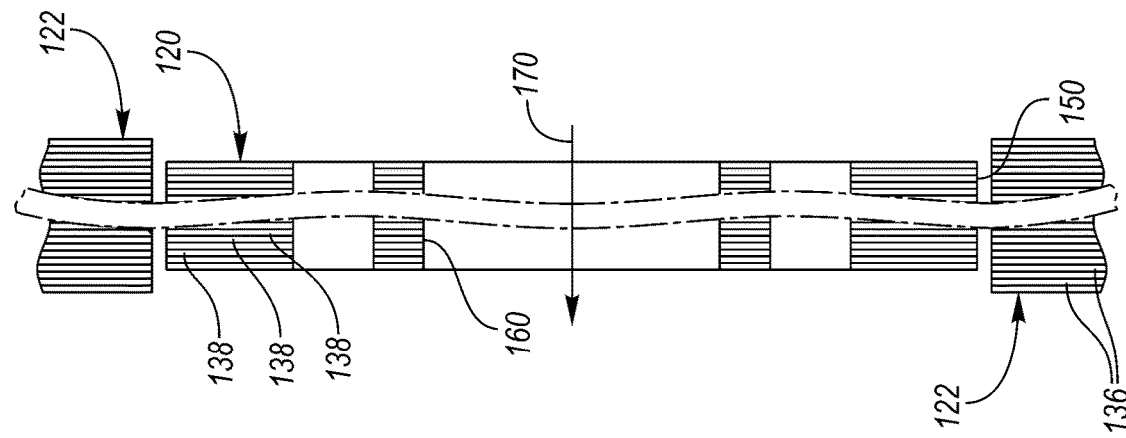
FIG. 2B is an illustration of a cross-sectional view of a rotor constructed of a series of rotor laminations.
Figure 2A:
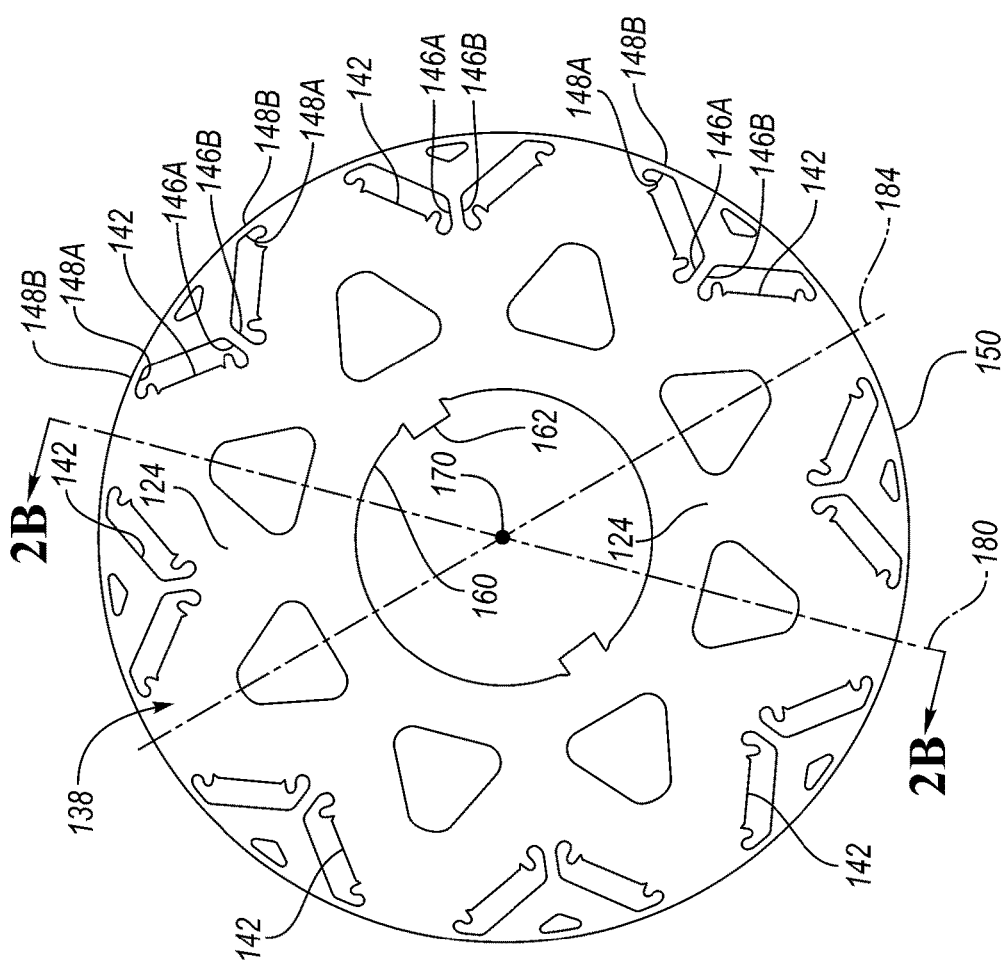
FIG. 2A is an illustration of a top view of a rotor lamination.

The electric machines 14 may be Interior Permanent Magnet (IPM) machines that include a stator core 122 and a rotor core 120. FIG. 2A depicts an example rotor lamination 138 and FIG. 2B depicts a side view of a stator core 122 and a rotor core 120 configuration having multiple rotor laminations 138 and multiple stator laminations 136 arranged in an axially stacked relationship. The rotor laminations 138 and the stator laminations 136 may be coated with an insulating coating to aid in preventing induced currents from flowing between laminations. The rotor laminations 138 may define a circular central opening 160 for accommodating a drive shaft with a keyway that may receive a drive key 162. The rotor laminations 138 may define a plurality of magnet openings 142 that are symmetrically disposed with respect to adjacent pairs of magnet openings 142. The magnet openings 142 may be grouped in pairs with each of the pairs forming a V-shape.

A plurality of rotor sectors 124 corresponding to poles of the rotor may be defined by a plurality of inter-polar axes (e.g., 180, 184) emanating from a central axis 170 of rotation to an outer surface 150 of the rotor lamination 138. Each of the sectors 124 may include a pair of magnet openings 142. The pairs of magnet openings may define a V-shape. In addition, a bridge region 146 may be defined at a base of the pair of magnet openings 142. The bridge region 146 (also referred to as center bridge region) includes the cross-sectional surface area (146A and 146B) within the openings that form the V-shape for each of the pairs. The cross-sectional surface areas 146A and 146B are generally a pair of surfaces that are substantially in parallel with each other. The bridge region 146 may be defined as the cross-section surface at the base of the V-shape at which the associated magnet openings 142 that form the pair are at a closest distance to one another. The bridge region 146 may also be defined as the surface area between where the associated magnet openings 142 almost touch. Outer bridge regions 148B (top bridge area) may be defined as the cross-sectional surface area on the outer surface 150 that is substantially parallel with an inner bridge regions 148A. The inner bridge regions 148A may be defined as the cross-sectional area substantially parallel with the arc 148B along the outer surface 150.

The inter-polar axes (e.g., 180, 184) may be positioned to be midway between adjacent magnet openings 142. Note that FIG. 2A only shows two of the possible inter-polar axes 180, 184 and does not show all possible inter-polar axes. FIG. 2B depicts a series of axially stacked rotor laminations 138 that are stacked along the central axis 170 about which the rotor core 120 is configured to rotate.

Figure 3:
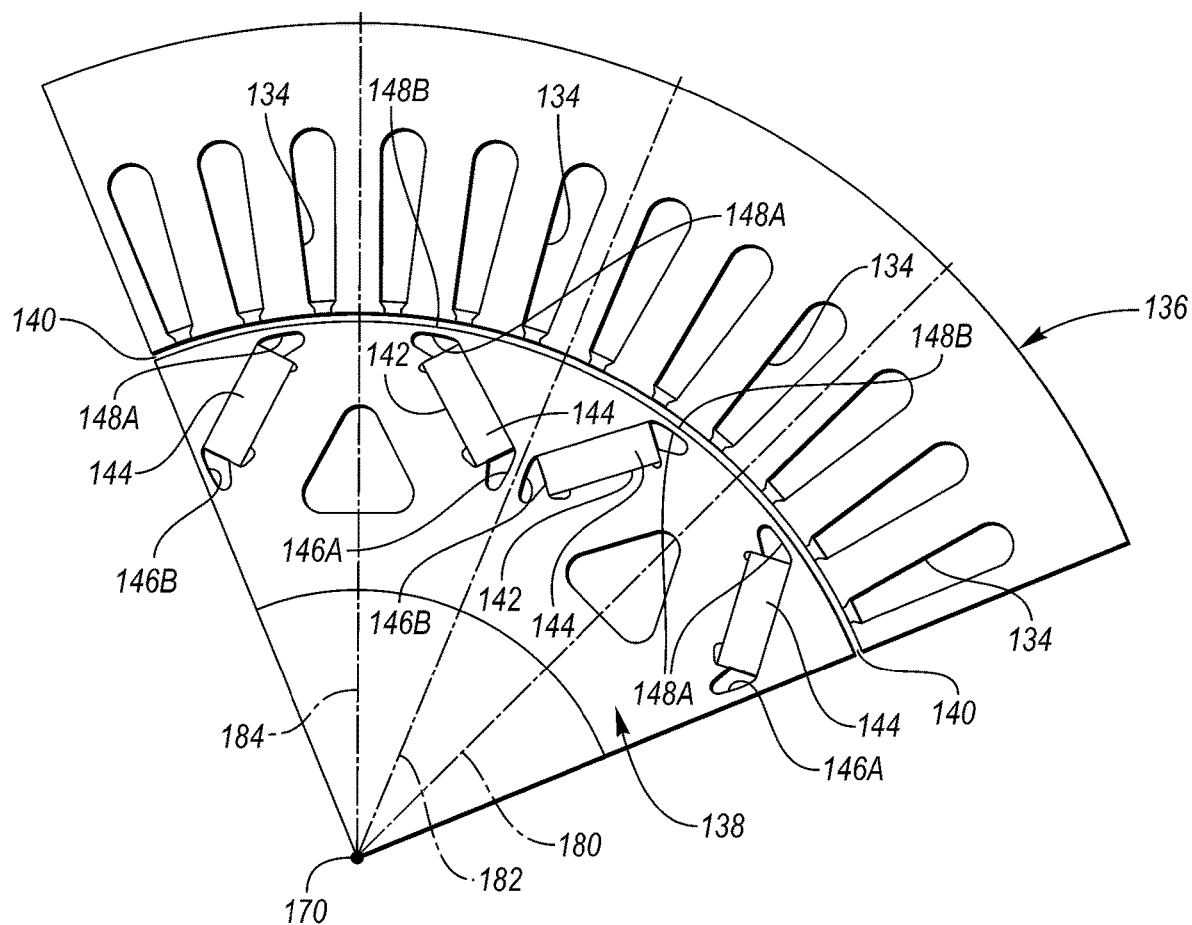
FIG. 3 is an illustration of a top view of a partial rotor and stator lamination.

FIG. 3 depicts a partial radial cross-sectional view of a possible construction of the rotor core 120 and the stator core 122. A partial stator lamination 136 and a partial rotor lamination 138 are depicted in FIG. 3. The rotor laminations 138 and the stator laminations 136 may be comprised of a ferrous alloy. A small air gap 140 is located between the inner periphery of the stator laminations 136 and the outer periphery 150 of the rotor laminations 138. The stator laminations 136 may define radially extending openings 134 forming teeth about an inner circumference of the stator core 122.

The rotor laminations 138 may define symmetrically positioned magnet openings 142 near the outer periphery 150 of each rotor lamination 138. Each magnet opening 142 may be configured to receive a magnet 144. Any number of laminations in a given design may be used, depending on design choice. The rotor laminations 138 and the stator laminations 136 may be arranged in a stack along the axis 170 of rotation. The axially stacked rotor laminations 138 and the magnets 144 may define a plurality of magnetic poles distributed about the axis 170.

The stator core 122 may include conductors disposed in the radially extending openings 134 to form windings. The stator core 122 may be comprised of an iron core made of a stack of stator laminations 136 and a winding arrangement for conductors that carry an excitation current. Current flowing through the stator windings generates a stator electromagnetic flux. The stator flux may be controlled by adjusting the magnitude and frequency of the current flowing through the stator windings.

The rotor core 120 may be comprised of an iron-based core comprised of a stack of rotor laminations 138 and sets of permanent magnets 144 inserted within holes or cavities 142 that are defined by the iron core. The permanent magnets 144 in the rotor core 120 may generate a rotor electromagnetic flux. The rotor flux may include harmonic fluxes due to shapes and sizes of the discrete permanent magnets. The stator flux and the rotor flux may be distributed in the air-gap 140. Interaction between the stator flux and the rotor flux causes the rotor core 120 to rotate about the axis 170.

Poles of the rotor core 120 may be geometrically defined to correspond to the sectors 124 defined by the rotor laminations 138. Each of the poles may be represented by a sector 124. A pole location may be generally defined by a center-pole axis 182 that extends radially from the axis 170 toward the outer surface 150 of the rotor 138 along a midpoint between adjacent magnet openings 142. The inter-polar axes (e.g., 180, 184) may extend radially from the axis 170 toward the outer surface 150 of the rotor lamination 138 between adjacent poles. An angular distance between two adjacent poles may define a pole pitch parameter. The arc length on the circumferential rotor surface 150 between two adjacent poles of the rotor may be referred to as the pole pitch. The pole pitch may be measured circumferentially around the outer rotor surface 150 between adjacent center-pole axes 182. Each pole may have an associated surface area on the outer perimeter surface 150 of the rotor core 120. Each pole may be represented by the arc length on the surface between adjacent inter-polar axes 180, 184.

Electrical steel is used in electrical applications to construct electrical devices such as power transformers, distribution transformers, and electric machines (motors and generators). Electrical steel may include a range of iron alloys that have favorable magnetic properties for electric machine construction. Iron alloys suitable for electrical steel may include a percentage of silicon. Electrical steel is typically formed into sheets that may be cut or punched to form laminations. During usage, cyclic variation of the applied magnetic field dissipates energy in the electrical steel which is referred to as core loss. Improvements in device efficiency may be achieved by reducing the core loss in the electrical steel.

Electrical devices (e.g., electric machine 14) may be constructed of stacks of electrical steel sheets. Electrical devices may include electric machines, transformers, inductors, and other devices that are comprised of a laminated core. The electrical steel sheets may be cut to a finished shape by a punch and die. For example, rotor laminations 138 and stator laminations 136 may be formed by punching or cutting the desired shape from sheets of electrical steel. The finished shapes may be stacked and laminated together to form a core (e.g., stator core 122, rotor core 120). The punching process involves strong shearing forces at the cutting edge of the shapes and as a result plastic deformation exists in these regions. Tensile residual stress and microscopic defects from cutting affect the structural integrity of the core. In particular, thin areas such as the center bridge 146 and the top bridge 148 are more susceptible due to the decrease in material and structure to hold the bridges (146, 148) in place.

In addition, past processing techniques may lead to the laminations having homogeneous properties. However, to improve electrical device performance, local regions of the laminations may be additionally processed to achieve different properties in those local regions. Such additional processing can improve overall electrical device performance and structural integrity. For example, areas with increased thickness may have inherent strength due to bonding of the material, while thin areas may be susceptible to the centrifugal force during operation.

A method for processing electrical steel may include the following steps. The electrical steel may be punched into a finished shape. The finished shape may be a lamination for an electrical device core. For example, the finished shape may be a rotor lamination 138 or a stator lamination 136 for an electric machine 14. The finished shape may be a transformer core lamination. The individual laminations may be stacked and laminated to produce a core (e.g., rotor core 120, stator core 122, transformer core). The assembled cores may be treated at the cut edges by blasting processes that mechanically smooth the cut edges. The blasting processes may include shot blasting (using metal shot), sandblasting, glass bead blasting, media blasting (using organic or inorganic media such as ground-up plastic, walnut shells, or corncobs), soda blasting (with baking soda), liquid blasting, ice blasting, and dry-ice blasting. Blasting is forcibly propelling a stream of abrasive material against a surface under pressure to smooth a rough surface. The pressure and propulsion is provided by a pressurized fluid, such as compressed air or a compressed liquid. Similar with blasting, peening in also forcibly propelling a stream of abrasive material against a surface under pressure, however, blasting is at a lower pressure than peening, and the media used in blasting is less dense than the media used in peening processes. As used herein, blasting also contemplates peening.

Often fatigue happens at locations of high stress due to centrifugal force. Depending on the specific rotor design and stress distribution, these high stress regions can be at the rotor center bridges, top bridges, or other locations of the rotor laminations. These regions are also typically along the punched edges. A post cutting inspection of these bridge areas reveals various microscopic defects, which makes the occurrence of fatigue initiated in these regions much higher.

Figure 4:
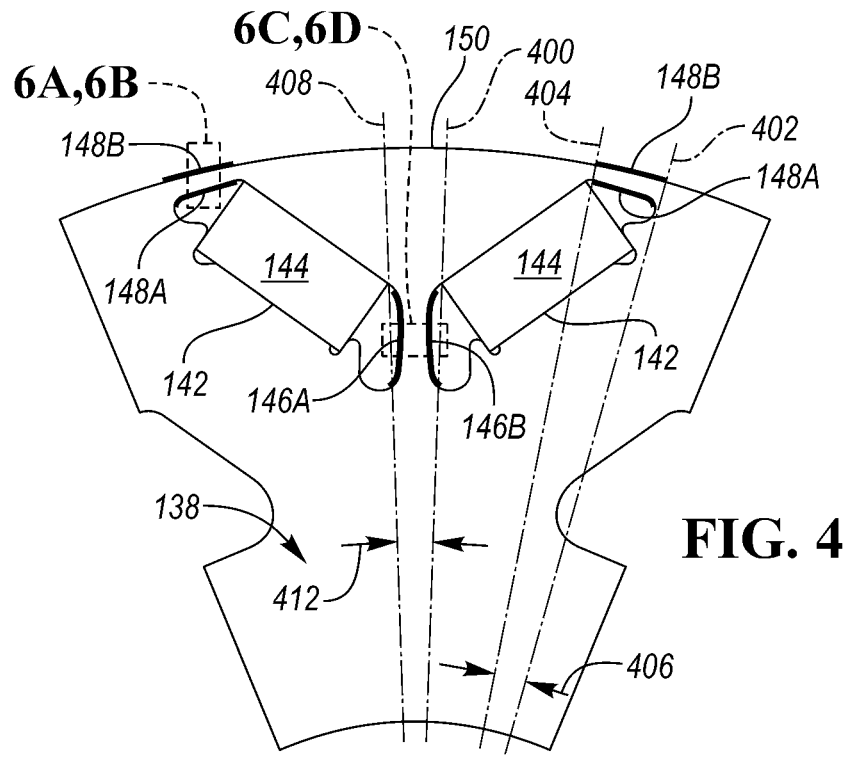
FIG. 4 is an illustration of a partial rotor having blasting surfaces of a rotor core.

FIG. 4 is an illustration of a partial rotor 138 having blasting surface regions 146, 148 associated with the rotor core. The rotor laminations 138 may define a rotor lamination outer perimeter surface 150 that extends around the periphery of the rotor lamination 138. An arc 148B (stripe) along the outer perimeter 150 is an area that is blasted to remove defects and increase structural integrity. The arc 148B is associated with an inner region 148A within the opening 142 that is substantially parallel with the arc 148B. The region 148B ends where the opening 142 diverges from being substantially parallel with the circumference 150. Likewise, an inner bridge region 146A within the opening 142 is a region that is substantially parallel with the opposite region 146B of a neighboring opening 142. The regions 146A, 146B may also be defined as a surface area within the opening 142 that is within a predetermined distance apart. The highlighted regions for blasting treatment (e.g., 146 and 148) of FIG. 4 and FIG. 5 are illustrative and may include curvature of an arc within the void 142 proximate with the perimeter 150.

FIG. 4 also illustrates a plane that bisects the lamination 138 along a radius 402 having an angle 406 with a second plane along a second radius 404. The surface 148A that is along opening 142 closest to the perimeter may extend from the first to the second plane. Also, the resultant arc 148B along the perimeter of the lamination 138 may extend from the first to the second plane. It should be noted that arc 148B may extend beyond a plane by a predetermined amount that may be measured in terms of percentages (e.g., 10%, 15%, and 25%) or by a unit of measure (e.g., ¼ inch, 5 mm, or 10 mm). FIG. 4 also illustrates a third plane that bisects the lamination 138 along a third radius 400 having an angle 412 with a fourth plane along a fourth radius 408. The third and fourth planes along the third and fourth radiuses 400, 408 may be used to limit surfaces 146A and 146B such that the surfaces (146A 146B) are the along the magnet opening 142 and within the sector defined by the planes along the radiuses 400, 408.

Figure 5:
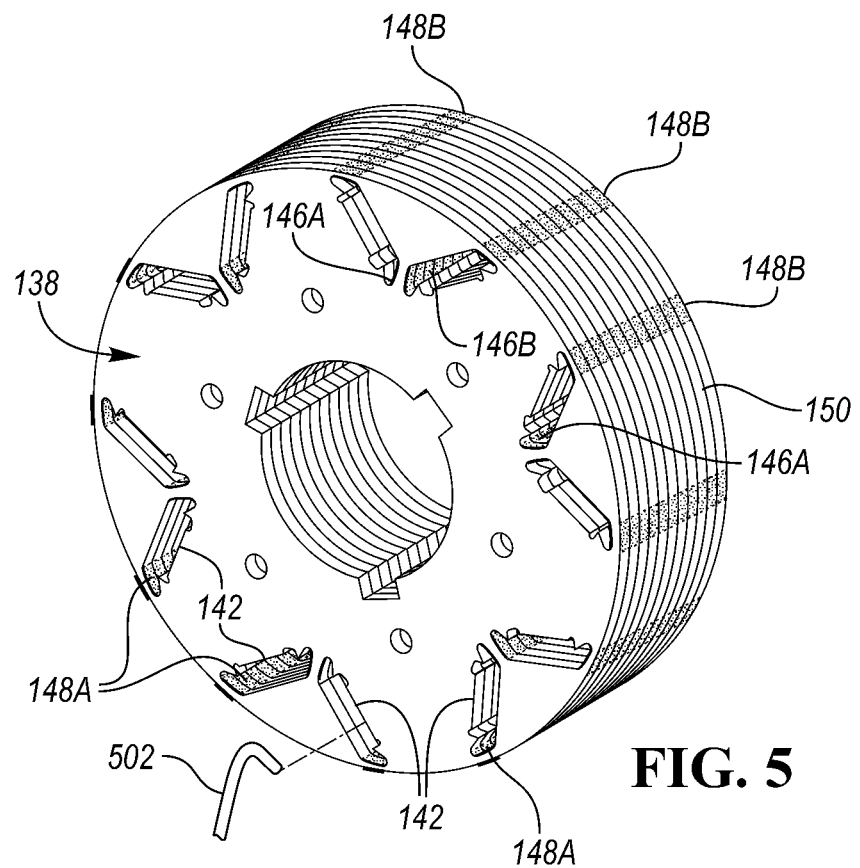
FIG. 5 is an illustration of a rotor lamination depicting examples of areas to be blasted.

FIG. 5 is an illustration of a rotor lamination 138 depicting examples of areas to be blasted 146, 148. The rotor outer perimeter surface may include the rotor lamination outer perimeter surface 150 of each of the rotor laminations 138. The rotor outer perimeter surface may be cylindrically shaped. In a similar manner as described in relation to the stator core 122, a nozzle 502 may selectively direct a stream of particles toward the arc 148B of the rotor outer perimeter surface 150. Likewise, the nozzle 502 may selectively direct a stream of particles toward the inner surfaces 146A, 146B, and 148A within the magnet opening 142.

For blasting the selective arc 148B of the rotor outer perimeter surface 150, the nozzle 502 may be moved in a controlled manner to move axially and rotationally about the rotor core. Alternatively, the rotor core may be moved relative to the nozzle 502 in order to cause the particle stream to impact the selected rotor surfaces 146, 148. Also, the rotor core may be masked exposing the region to be blasted, after which the masking may be removed.

The surface that is defined within the magnet openings 142 may also be blasted. For example, a second nozzle not shown or the nozzle 502 may be configured to direct a particle stream into the magnet openings 142 to blast the selective surfaces (146A, 146B, and 148A) defined within the magnet openings 142. The second nozzle may be moved and rotated within the opening defined by the magnet openings 142 to blast the selected surface. Also, the opening 142 may be masked to expose the surfaces 146A, 146B, and 148A to be blasted.

One method of blasting the surface is shot blasting. Shot blasting is a technique in which small particles are impacted with a surface. The small particles may be spherical particles composed of metal, glass and/or ceramic material. The particles may be propelled by a fluid such as air or a liquid. Each particle acts as a small blasting hammer producing small indentations on the surface. For example, pressurized air may accelerate the particles through a nozzle 502 to form a particle stream. The particle stream may impact the selective rotor surfaces 146, 148. The impacts of the particles cause removal of cutting defects and smoothing of the cutting edges in the rotor. The blasting media may be chosen based on the mechanical properties and thickness of the lamination. Blasting parameters such as intensity, exposure time, air pressure, impact angle, and nozzle characteristics may be chosen to optimize the process and maximize fatigue life.

FIG. 5 depicts an example of processing an assembled core as applied to a rotor for an electric machine. In other applications, the blasting procedure may be applied to other selective surfaces that are comprised of cut edges of the laminations. This may include outer perimeter surfaces, inner perimeter surfaces, and any surfaces defined by openings or slots within the core.

FIG. 5 depict the process in which the assembled rotor core is blasted. Alternatively, each lamination may be treated before assembly.

So, at the pre-identified fatigue failure occurrence regions 146, 148, the blasting media is propelled to the cutting surface of these regions by a pressurized carrier, typically compressed air, or a centrifugal wheel. There are several variants of the process, using various media; some are highly abrasive, whereas others are milder. The most abrasive are shot blasting with metal shot and sandblasting with sand. Moderately abrasive variants include glass bead blasting with glass beads and media blasting with ground-up plastic stock or walnut shells and corncobs. A mild version is soda-blasting with baking soda. In addition, there are alternatives that are barely abrasive or nonabrasive, such as ice blasting and dry-ice blasting.

By bombarding the cutting edges, the rotor top bridges and center bridges, with suitable media, the original cutting surface microscopic defects may be smoothed out. During the blasting process, the blasting media is chosen based on the mechanical properties, thickness of lamination and the size of microscopic defects. Blasting parameters such as media type, intensity, exposure time, coverage, air pressure, centrifugal wheel speed, impact angle and nozzle characteristics are carefully chosen to optimize the surface smoothing process and minimize material abrasion.

Figure 6A:
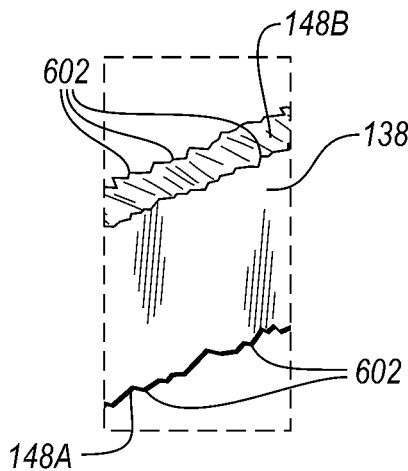
FIG. 6A is a perspective cross-sectional view of the rotor of FIG. 4 prior to blasting.
Figure 6B:
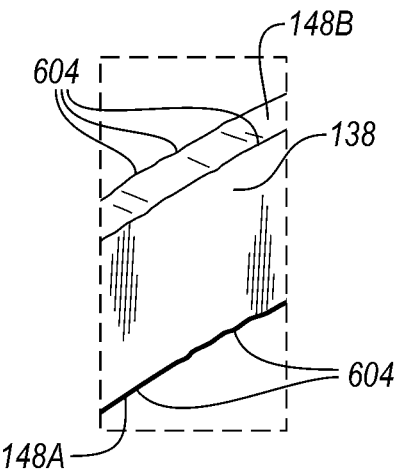
FIG. 6B is a perspective cross-sectional view of the rotor of FIG. 4 after to blasting.
Figure 6C:
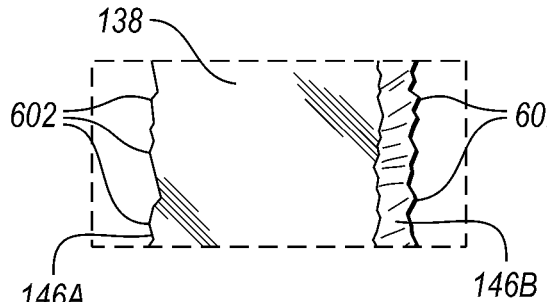
FIG. 6C is a perspective cross-sectional view of the rotor of FIG. 4 prior to blasting.
Figure 6D:
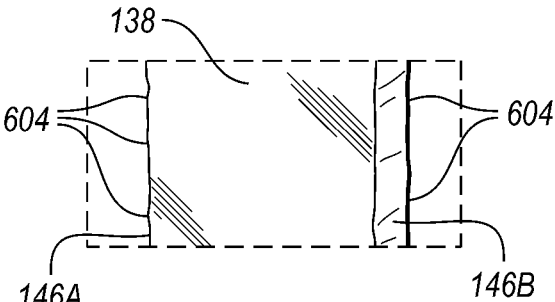
FIG. 6D is a perspective cross-sectional view of the rotor of FIG. 4 prior to blasting. 100.161

FIG. 6A is a perspective cross-sectional view of the rotor of FIG. 4 prior to blasting. FIG. 6B is a perspective cross-sectional view of the rotor of FIG. 4 after blasting. FIG. 6C is a perspective cross-sectional view of the rotor of FIG. 4 prior to blasting. FIG. 6D is a perspective cross-sectional view of the rotor of FIG. 4 after to blasting.

In the cross-sectional images of electrical steel before (6A, 6C) and after (6B, 6D) blasting, a rough/jagged edge 602 is shown before blasting (6A, 6C) and a smoothed cut surface 604 is shown after blasting (6B, 6D) the rotor 138. The top bridge cross-sectional areas are shown in (6A, 6B), while the center bridge cross-sectional areas are shown in (6C, 6D). After the blasting, a smoother cut surface with reduced microscopic punching defects has been observed.

The mechanical smoothing of the cut edges of electrical steel is not limited to blasting treatment. Microscopic defects due to punching can also be removed by various peening processes: such as shot peening, laser peening, cavitation peening and wet shot peening. Peening process also creates a compressive residual stress layer at the edges, which is also beneficial for fatigue life improvement.

It is worth noting that the above-proposed treatment at the center and top bridges of rotor cores can be applied to other core topologies besides the ones shown in FIGS. 4 and 5. The exact position, shape, and size of treatment regions depend on core topology and may vary among different core designs.

A method for improving fatigue life in an electrical device core may be implemented as described. The method may include punching laminations from one or more electrical steel sheets that results in one or more cut edges in the laminations. The lamination may be assembled into a core such that an outer perimeter surface of the core is defined by the cut edges. The outer perimeter surface of the core may be blasted to smooth cutting edges and/or introduce compressive stress by any of the techniques described above. Such treatment may apply to both a rotor core and a stator core. Additional processing may be applied to the rotor core. The treatment may be performed by methods including blasting (e.g. shot blasting, sandblasting, glass bead blasting, media blasting, soda blasting, liquid blasting, ice blasting, and div-ice blasting) and peening (e.g. shot peening, laser peening, cavitation peening, and wet shot peening).

Other methods may be implemented that treat the laminations in a similar manner prior to assembling the core. Such methods may include punching laminations from one or more electrical steel sheets that results in one or more cut edges in the laminations. A mask may be placed over the lamination to expose predetermined surfaces of the lamination.

For example, the predetermined surfaces may include the top bridge surfaces of the rotor, namely the arc 148B along the outer surface 150 of the rotor and the inner surface 148A within the openings formed in the core (e.g., magnet openings 142). Also, the predetermined surfaces may include the center bridge surfaces 146A and 146B within the openings formed in the core (e.g., magnet openings 142). The mask may expose the predetermined surfaces to the blasting techniques described.

As above, the laminations may be formed from sheets of electrical steel. The electrical steel sheets may be of a predetermined thickness. The electrical steel sheets may be punched to create rotor laminations 138 and stator laminations 136. The laminations may be derived from one or more of the electrical steel sheets.

Figure 7:
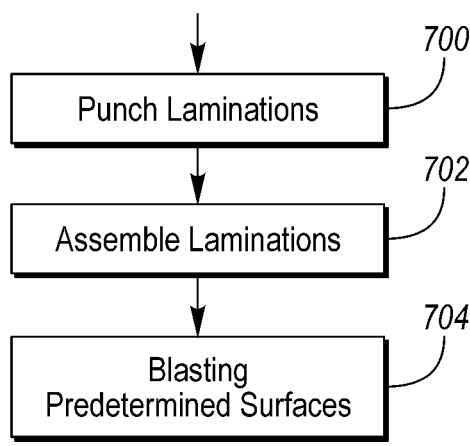
FIG. 7 depicts a sequence of operations for blasting a rotor of an electric machine.

FIG. 7 depicts an example process flow for a method of increasing fatigue life in an electrical device. At operation 700, core laminations are formed by punching a sheet of electrical steel resulting in one or more cut edges. At operation 702, the laminations may be assembled into a core such that an outer perimeter surface of the core is defined by the cut edges. At operation 704, the predetermined surfaces may be blasted by the techniques that have been previously described. For example, the predetermined surfaces may include the top bridge surfaces of the rotor, namely the arc 148B along the outer surface 150 of the rotor and the inner surface 148A within the openings formed in the core (e.g., magnet openings 142). Also, the predetermined surfaces may include the center bridge surfaces 146A and 146B within the openings formed in the core (e.g., magnet openings 142).

Figure 8:
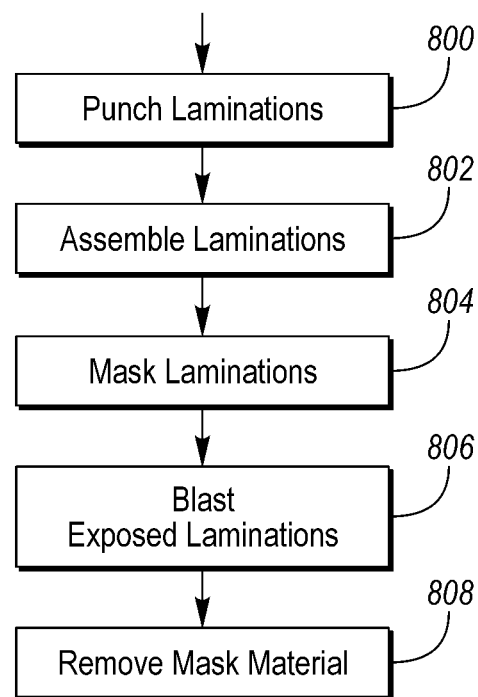
FIG. 8 depicts a sequence of operations for masking and blasting a rotor of an electric machine.

FIG. 8 depicts an example process flow for a method of increasing fatigue life in an electrical device. At operation 800, core laminations are formed by punching a sheet of electrical steel resulting in one or more cut edges. At operation 802, the laminations may be assembled into a core such that an outer perimeter surface of the core is defined by the cut edges. At operation 804, the assembled laminations are masked exposing predetermined surfaces. For example, the predetermined surfaces may include the top bridge surfaces of the rotor, namely the arc 148B along the outer surface 150 of the rotor and the inner surface 148A within the openings formed in the core (e.g., magnet openings 142). Also, the predetermined surfaces may include the center bridge surfaces 146A and 146B within the openings formed in the core (e.g., magnet openings 142). The masking may include application of a polymer, masking tape, or other thin film or metal sheet to protect areas covered while leaving other areas exposed and subject to the blasting. Alternatively, a nozzle (e.g., nozzle 502) may be able to selectively target specific areas (e.g., top bridge surfaces 148A and 148B and center bridge surfaces 146A and 146B). Limiting the blasting to these areas may reduce the time needed to process the laminations 138, thus reducing costs. At operation 806, the predetermined surfaces may be blasted by the techniques that have been previously described. For example, the predetermined surfaces may include the top bridge surfaces of the rotor, namely the arc 148B along the outer surface 150 of the rotor and the inner surface 148A within the openings formed in the core (e.g., magnet openings 142). Also, the predetermined surfaces may include the center bridge surfaces 146A and 146B within the openings formed in the core (e.g., magnet openings 142). Lastly in operation 808, the masking material may be removed from the surface via mechanically removing the tape (e.g., peeling the tape off), or a bath (plasma or wet bath) to remove the polymer. However, if the masking was done via mechanically directing the blast stream to the specific regions, then this operation would not be needed.

Although the description is applied to electric machines in a vehicle application, the methods described are applicable electrical devices used in any field of application. The methods are applicable to other rotating applications of electrical steel as well.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   punching electrical steel sheets to form laminations each having openings defining magnet pockets and adjacent inner side pockets that define a center bridge therebetween;
   assembling the laminations into an electrical device core; and
   blasting the adjacent inner side pockets without blasting the magnet pockets such that compressive stress layers are induced along edges of the center bridge to strengthen the center bridge.

2. The method of claim 1 further comprising blasting portions of an outer surface of the electrical device core such that spaced apart axial stripes of compressive stress layers are induced around a perimeter of the electrical device core.

3. The method of claim 1, wherein the openings further define outer side pockets and wherein the outer side pockets and a perimeter of the electrical device core define top bridges, further comprising blasting the outer side pockets without blasting the magnet pockets such that compressive stress layers are induced along inner edges of the top bridges to strengthen the top bridges.

4. The method of claim 3, further comprising blasting portions of an outer surface of the electrical device core such that compressive stress layers are induced along outer edges of the top bridges.

5. The method of claim 1, wherein the blasting is shot blasting, sandblasting, glass bead blasting, media blasting, soda blasting, liquid blasting, ice blasting, or dry-ice blasting.

6. The method of claim 1 further comprising, prior to the blasting, masking the magnet pockets.

7. An electric machine comprising:
   a plurality of planar laminations stacked to form an electrical steel rotor having openings defining magnet pockets and adjacent inner side pockets, wherein the adjacent inner side pockets define a center bridge therebetween and have blasted surface portions such that compressive stress layers are induced along edges of the center bridge to strengthen the center bridge.

8. The electric machine of claim 7, wherein the magnet pockets lack blasted surface portions.

9. The electric machine of claim 7, wherein the rotor further has spaced apart blasted surface portions forming axial stripes of increased compressive residual stress layers around a perimeter thereof.

10. The electric machine of claim 7, wherein the openings further define outer side pockets, wherein the outer side pockets and a perimeter of the rotor define top bridges, and wherein the outer side pockets have blasted surface portions such that compressive stress layers are induced along inner edges of the top bridges to strengthen the top bridges.

11. The electric machine of claim 10, wherein the rotor further defines and outer surface having blasted surface portions such that compressive stress layers are induced along outer edges of the top bridges.

* * * * *